United States Patent
Tabb

(10) Patent No.: US 11,657,211 B2
(45) Date of Patent: May 23, 2023

(54) WORKFLOW STYLE GOVERNANCE

(71) Applicant: Google LLC, Mountain View, CA (US)

(72) Inventor: Lloyd Tabb, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 371 days.

(21) Appl. No.: 16/783,166

(22) Filed: Feb. 6, 2020

(65) Prior Publication Data

US 2021/0248308 A1 Aug. 12, 2021

(51) Int. Cl.
*G06F 40/197* (2020.01)
*G06F 40/166* (2020.01)
*G06F 16/93* (2019.01)
*G06F 21/62* (2013.01)
*G06Q 10/10* (2023.01)

(52) U.S. Cl.
CPC ............ *G06F 40/166* (2020.01); *G06F 16/93* (2019.01); *G06F 21/6218* (2013.01); *G06F 40/197* (2020.01); *G06Q 10/10* (2013.01)

(58) Field of Classification Search
CPC .............................. G06Q 10/103; G06F 40/197
See application file for complete search history.

(56) References Cited

U.S. PATENT DOCUMENTS 8,804,177 B2 * 8/2014 Jahn ...................... G06F 3/1288
358/1.15
2003/0144982 A1 * 7/2003 Reulein ................ G06F 40/174
2011/0246869 A1 * 10/2011 Vion-Dury ............ G06F 40/143
715/229
2014/0101182 A1 * 4/2014 Roy ........................ G06F 16/93
707/756
2016/0246899 A1 * 8/2016 Hirschtick .............. G06F 30/00
(Continued)

FOREIGN PATENT DOCUMENTS

WO 2017003971 A1 1/2017

OTHER PUBLICATIONS

Deepa et al., "An analysis on Version Control Systems" 2020 International Conference on Emerging Trends in Information Technology and Engineering (ic-ETITE), pp. 1-9. (Year: 2020).*

(Continued)

*Primary Examiner* — Amelia L Tapp
(74) *Attorney, Agent, or Firm* — Honigman LLP; Brett A. Krueger

(57) ABSTRACT

A method, system and computer program product for workflow style governance includes creating a document and specifying a document style of the document—either a linear workflow style or a branched workflow style. Thereafter, in response to a subsequent request to load the document, the specified document style for the document may be retrieved and, on condition that the specified document style is a linear workflow style, a specified version of the document is retrieved into a document editor for editing as a new version of the document. But otherwise, on condition that the specified document style is a branched workflow style, different components of the document are retrieved as a composition of components, each of an independent version, and a selected one of the components of the composition of the components making up the document is then loaded into a component editor for editing as a new version.

12 Claims, 2 Drawing Sheets

(56) References Cited

U.S. PATENT DOCUMENTS

2016/0378735 A1* 12/2016 Mullins ................ G06F 40/137
715/201
2018/0164997 A1* 6/2018 Sinha ................ G06F 9/44526

OTHER PUBLICATIONS

Russell et al., "Business Process Management Systems," in Workflow Patterns: The Definitive Guide, MIT Press, 2016, pp. 61-101. (Year: 2016).*

International Search Report and Written Opinion for the related Application No. PCT/US2021/016483, dated May 20, 2021, 13 pages.

Tarkhanov Ivan: "Policy algebra for access control in enterprise document management systems", 2015 9th International Conference on Application of Information and Communication Technologies (AICT), IEEE, Oct. 14, 2015 (Oct. 14, 2015), pp. 225-228, XP032818324, DOI: 10.1109/ICAICT.2015. 7338551 ISBN: 978-1-4673-6855-1 [retrieved on Nov. 25, 2015].

* cited by examiner

WORKFLOW STYLE GOVERNANCE

BACKGROUND OF THE INVENTION

Field of the Invention

The present invention relates to the field of document management and more particularly to document editing.

Description of the Related Art

Document management refers to the retrieval and storage of documents in a repository an organized and documented way so that individually stored documents in the repository may be reliably retrieved on demand by different end users without fear of loss of data. Modern document management computer programs incorporate version control in which different versions of a document may be created persisted and retrieved. Version control provides not merely a convenient way for a single end user to track changes from document to document in the lifecycle of the document from initial creation to deletion. But, version control also enables collaborative document editing amongst different end users so that the edits to a document of one end user can be visualized by others in sequence, and also multiple different concurrent edits to a document by different end users can be managed separately.

Traditionally, documents are managed in sequence as part of a linear workflow in which each different version of a document is a separate file loadable into a document editor such as a word processor or text editor. However, not all documents are singular files. Rather, some documents are compositions of components which, when assembled dynamically present as a document. Examples of component driven documents include portal web pages assembled dynamically from different portlet components, or document assemblies assembled from different files each corresponding to a different portion of the document and each editable and persistable separately from other components in the assembly. In the latter instance, a document assembly is edited according to a branched workflow style in which each component has different versions, but any one document may be assembled from any one version of each of the components composited together to form the document.

As can be seen, both a linear workflow style and a branched workflow style may act as a desirable basis upon which a document is to be managed. However, as a practical matter, the conventional document management system only supports one—either linear workflow or branched workflow. Thus, the end user must adapt to two different document management applications to accommodate both a linear workflow style from some documents and a branched workflow style for others.

BRIEF SUMMARY OF THE INVENTION

Embodiments of the present invention address deficiencies of the art in respect to document editing and version control and provide a novel and non-obvious method, system and computer program product for workflow style governance. In an embodiment of the invention, a workflow style governance method includes creating a document in memory of a host computing system including one or more computers each with memory and at least one processor and specifying a document style of the document selected from the group consisting of a linear workflow style and a branched workflow style, the linear workflow style permitting a linear sequence of versioning of an entirety of the document, the branched workflow style permitting separate and independent versioning of different fractional portions of the document and the compositing of the different fractional portions to produce a version of the document. The method additionally includes saving the document into fixed storage of the host computing system along with the specified document style.

Thereafter, in response to a subsequent request to load the document into memory of one of the computers, the specified document style for the document may be retrieved and, on condition that the specified document style is a linear workflow style, a specified version of the document is retrieved into a document editor for editing as a new version of the document, but otherwise on condition that the specified document style is a branched workflow style, different components of the document are retrieved as a composition of components, each of an independent version, and a selected one of the components of the composition of the components making up the document is then loaded into a component editor for editing as a new version.

In one aspect of the embodiment, the method additionally includes deferring a re-composition of the document for which a branched workflow has been specified subsequent to having edited a component of the document, but saving the edited component in a pre-commit state in the fixed storage. In another aspect of the embodiment, the method additionally includes permitting editing of the document for which a linear workflow has been specified only if an end user requesting access to the document for editing has access rights to a location in the fixed storage where the document is stored. In yet another aspect of the embodiment, the method additionally includes permitting editing of the selected one of the components of the document for which a branched workflow has been specified only if an end user requesting access to the document for editing has access rights to the selected one of the components irrespective of other access rights of the end user for other components of the document which differ from the access rights to the selected one of the components.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for workflow style governance in document management. In accordance with an embodiment of the invention, a document is created for editing and a document style specified for the created document. In this regard, the document style may be a linear workflow style or a branched workflow style, in that the linear workflow style permits a linear sequence of versioning of an entirety of the document, while the branched workflow style permits separate and independent versioning of different fractional portions of the document and the compositing of the different fractional portions to produce a version of the document. Then, the document is saved into fixed storage along with the specified document style. Thereafter, in response to a subsequent request to load the document into memory of one of the computers, the specified document style for the document is retrieved and on the condition that the specified document style is a linear workflow style, a specified version of the document is provided to a document editor for editing as a new version of the document, but otherwise on the condition that the specified document style is a branched workflow style, different components of the document are retrieved as a composition of components, each of an independent version, and a selected one of the components is provided to a component editor for editing as a new version. In this way a single document management application is enabled to process different documents according to different workflow styles irrespective of the underlying workflow style of any one document.

Figure 1:
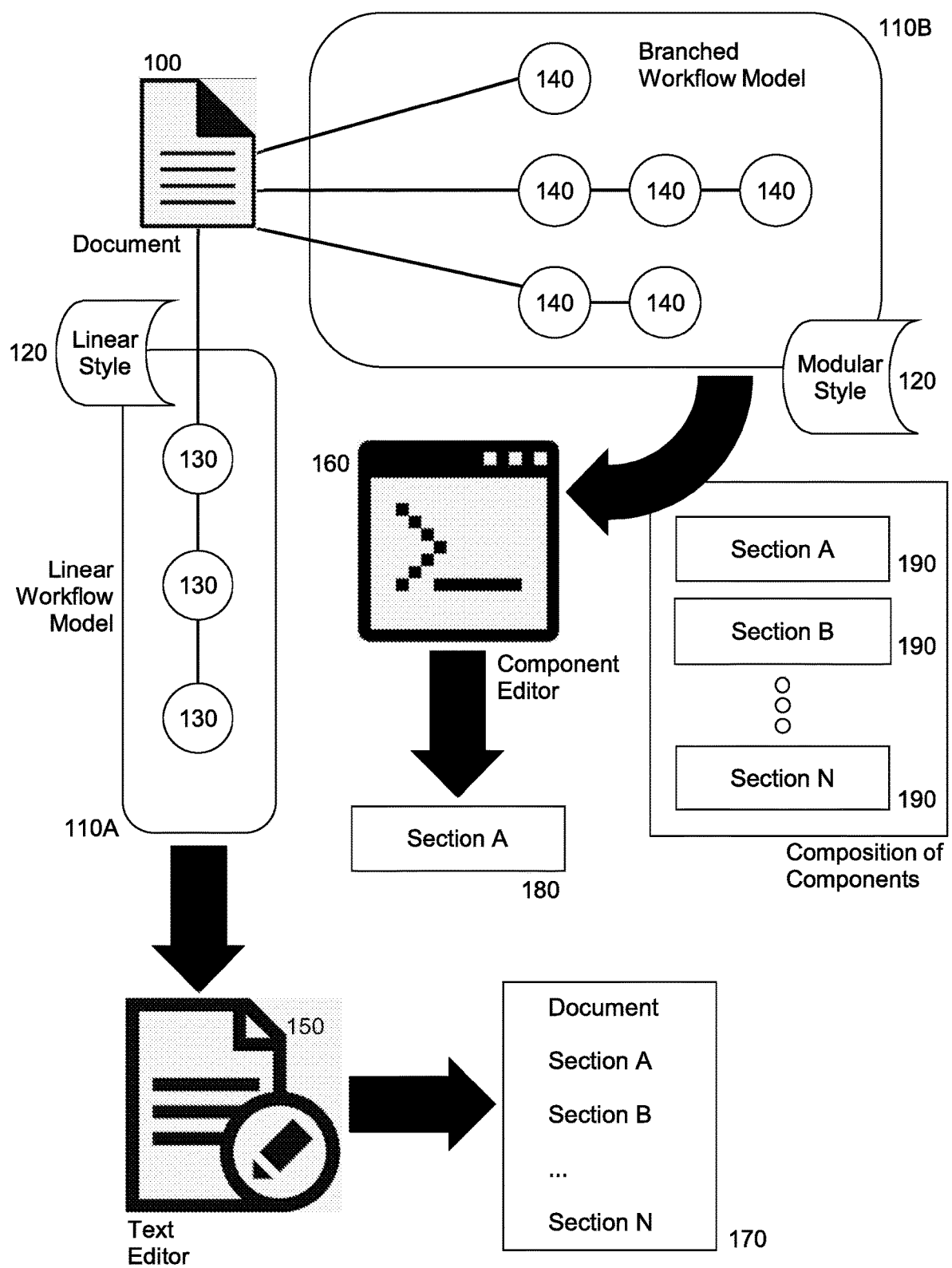
FIG. 1 is pictorial illustration of a process for workflow style governance for document management.

In further illustration, FIG. 1 is pictorial illustration of a process for workflow style governance for document management. As shown in FIG. 1 a document 100 can be persisted as either a singular version amongst a multiplicity of versions 130 of a linear workflow model 110A, or the document 100 can be persisted as a composition of versioned components 140 in a branched workflow model 110B. Along with the persistence of the document 100, a style selection 120 is included so that upon retrieval of the document 100 for editing, a determination is made based upon the recalled style selection 120, whether to provide the document 100 to a text editor 150 in which the entirety of the content 170 of the document 100 may be edited, or whether to provide the document 100 to a component editor 160 in which a selected component 180 from amongst a composition of components 190 may be edited.

Figure 2:
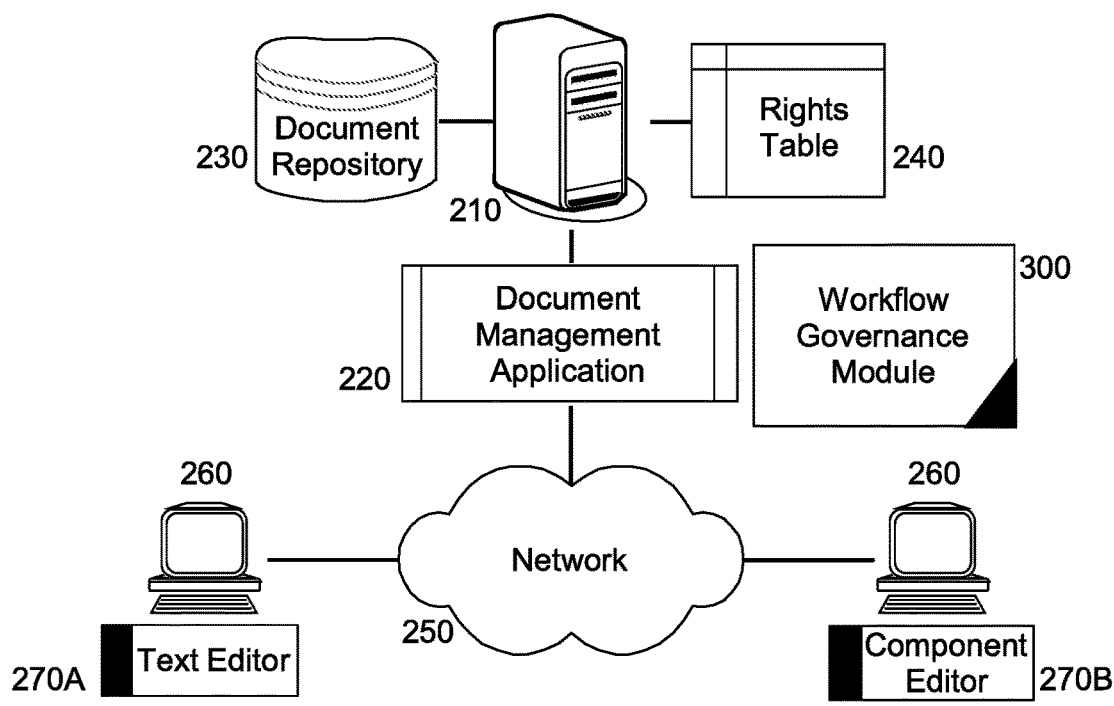
FIG. 2 is a schematic illustration of a document management data processing system adapted for workflow style governance; and, FIG. 3 is a flow chart illustrating a process for workflow style governance in document management.

The process described in connection with FIG. 1 may be implemented in a document management data processing system. In yet further illustration, FIG. 2 schematically shows a document management data processing system adapted for workflow style governance. The system includes a host computing platform 210 that includes one or more computers, each with memory and at least one processor. The host computing platform is coupled to a document repository 230 storing therein, different documents both as a singular file and also as a composition of components to form a virtual file. As well, the host computing platform 210 supports the execution therein of a document management application 220 configured to manage access to the documents in the document repository 230 by requesting computing devices 260 over computer communications network 250, including versioning of the documents when edited in those computing devices 260, and with respect to access rights stored in a rights table 240.

Of note, a workflow governance module 300 is coupled to the document management application 220. The module 300 includes computer program instructions enabled during execution in the host computing platform 210, to assign to each document persisted in the document repository 230, a workflow style selection of either linear or branched. The program instructions additionally are enabled when loading a document from the document repository 230, to identify a correspondingly assigned workflow style selection and to provide the document for editing in a text editor 270A on condition that the workflow style selection is linear, or to provide the document for editing in a component editor 270B on condition that the workflow style selection is branched.

Optionally, in response to a request persist an edited document associated with a linear workflow selection, the request is denied in the event the program instructions determined that an identity of the requestor lacks rights to a location in the document repository 230. As another option, in response to a request persist an edited document associated with a branched workflow selection, the request is denied only if requestor has access rights to the selected one of the components irrespective of other access rights of the requestor for other components of the document which may differ from the access rights to the selected one of the components. As even yet another option, the program instructions may be enabled to defer a re-composition of the document with the selected component, but to save the edited form of the selected component in a pre-commit state in the document repository 230 and to permit re-composition of the document only once a directive is received in the document management application to commit the edits to the selected one of the components.

Figure 3:
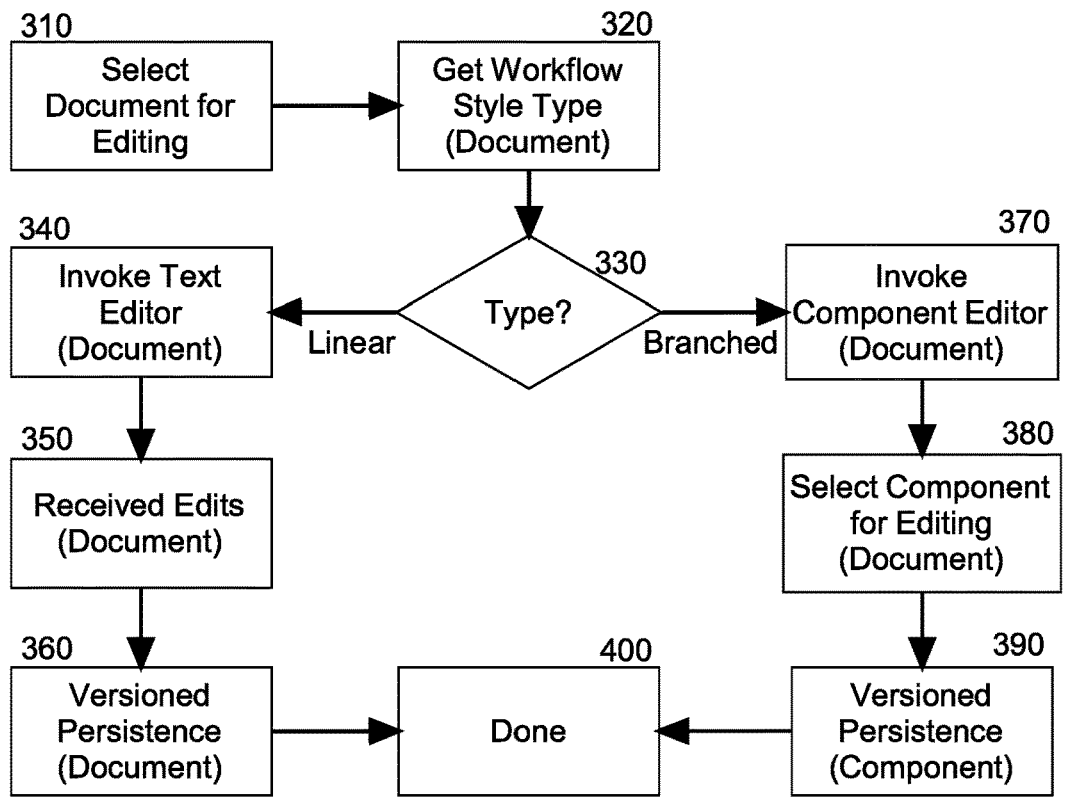

In even yet further illustration of the operation of the workflow governance module 300, FIG. 3 is a flow chart illustrating a process for workflow style governance in document management. Beginning in block 310, a document persisted in the document repository is selected for retrieval for editing. In block 320, a workflow style selection is retrieved in association with the document. In decision block 330, it is determined whether the workflow style selection is linear or branched. If linear, in block 340 a text editor is invoked for editing the document and in block 350, edits to the document are received for persistence in the repository. Thereafter, in block 360 the edited document is subjected to version control and stored in the repository and the process ends in block 400. In contrast, if branched, in block 370 a component editor is invoked for editing the document and in block 380, one of the components in a composition of components forming the document is selected for editing and in block 390, the edited component is subjected to version control and stored in the repository. Finally, the process ends in block 400.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A workflow style governance method comprising:
    creating a document in memory of a host computing system including one or more computers each with memory and at least one processor;
    specifying a document style of the document selected from the group consisting of a linear workflow style and a branched workflow style, the linear workflow style permitting a linear sequence of versioning of an entirety of the document, the branched workflow style permitting separate and independent versioning of each of a plurality of components of the document and compositing of the plurality of components to produce a version of the document;
    saving the document into fixed storage of the host computing system along with the specified document style; and,
    responsive to a subsequent request to load the document into memory of one of the computers, retrieving the document using a document editor or a components editor based on the specified document style by:
        in response to the specified document style for the document specifying the linear workflow style, retrieving a specified version of an entirety of the document into the document editor for editing as a new version of the document; and
        in response to the specified document style for the document specifying the branched workflow style:
            retrieving a component of the plurality of components of the document; and
            loading the component into the component editor for editing as a new component version of the component, the component less than the entirety of the document, and the document editor different than the component editor.

2. The method of claim 1, further comprising deferring a re-composition of the document for which the branched workflow has been specified subsequent to having edited the component of the document, but saving the edited component in a pre-commit state in the fixed storage.

3. The method of claim 1, further comprising permitting editing of the document for which the linear workflow style has been specified only if an end user requesting access to the document for editing has access rights to a location in the fixed storage where the document is stored.

4. The method of claim 1, further comprising permitting editing of the component of the document for which the branched workflow has been specified only if an end user requesting access to the document for editing has access rights to the component irrespective of other access rights of the end user for other components of the document which differ from the access rights to the component.

5. A document management data processing system adapted for workflow style governance, the system comprising:
   a host computing platform comprising one or more computers, each with memory and at least one processor;
   a document repository storing documents;
   a document management computer program executing in the memory of the host computing platform and configured for persisting the documents stored in the document repository and retrieving the documents from the document repository; and,
   a workflow style governance module coupled to the document management computer program and comprising computer program instructions enabled during execution in the host computing platform, to perform:
   specifying a document style of a document in the document management computer program, the document style selected from the group consisting of a linear workflow style and a branched workflow style, the linear workflow style permitting a linear sequence of versioning of an entirety of the document, the branched workflow style permitting separate and independent versioning of each of a plurality of components of the document and compositing of the plurality of components to produce a version of the document;
   saving the document into the document repository along with the specified document style; and,
   responsive to a subsequent request to load the document, retrieving from the document repository the document using a document editor or a components editor based on the specified document style by:
      in response to the specified document style for the document specifying the linear workflow style, retrieving a specified version of an entirety of the document in the document management computer program and providing the specified version of the entirety of document to the document editor for editing as a new version of the document; and
      in response to the specified document style for the document specifying the branched workflow style:
         retrieving a component of the plurality of components of the document; and
         providing the component to the component editor for editing as a new component version of the component, the component less than the entirety of the document, and the document editor different than the component editor.

6. The system of claim 5, wherein the program instructions further include deferring a re-composition of the document for which the branched workflow has been specified subsequent to having edited the component of the document, but saving the edited component in a pre-commit state in the document repository.

7. The system of claim 5, wherein the program instructions further include permitting editing of the document for which the linear workflow style has been specified only if an end user requesting access to the document for editing has access rights to a location in the document repository where the document is stored.

8. The system of claim 5, wherein the program instructions further include permitting editing of the component of the document for which the branched workflow has been specified only if an end user requesting access to the document for editing has access rights to the component irrespective of other access rights of the end user for other components of the document which differ from the access rights to the component.

9. A computer program product for workflow style governance, the computer program product including a computer readable storage medium having program instructions embodied therewith, the program instructions executable by a device to cause the device to perform a method including:
   creating a document in memory of a host computing system including one or more computers each with memory and at least one processor;
   specifying a document style of the document selected from the group consisting of a linear workflow style and a branched workflow style, the linear workflow style permitting a linear sequence of versioning of an entirety of the document, the branched workflow style permitting separate and independent versioning of each of a plurality of components of the document and compositing of the plurality of components to produce a version of the document;
   saving the document into fixed storage of the host computing system along with the specified document style; and,
   responsive to a subsequent request to load the document into memory of one of the computers, retrieving the document using a document editor or a components editor based on the specified document style by:
      in response to the specified document style for the document specifying the linear workflow style, retrieving a specified version of an entirety of the document into the document editor for editing as a new version of the document; and
      in response to the specified document for the document specifying the branched workflow style:
         retrieving a component of the plurality of components of the document; and
         loading the component into the component editor for editing as a new component version of the component, the component less than the entirety of the document, and the document editor different than the component editor.

10. The computer program product of claim 9, wherein the method further includes deferring a re-composition of the document for which the branched workflow has been specified subsequent to having edited the component of the document, but saving the edited component in a pre-commit state in the fixed storage.

11. The computer program product of claim 9, wherein the method further includes permitting editing of the document for which the linear workflow style has been specified only if an end user requesting access to the document for editing has access rights to a location in the fixed storage where the document is stored.

12. The computer program product of claim 9, wherein the method further includes permitting editing of the component of the document for which the branched workflow has been specified only if an end user requesting access to the document for editing has access rights to the component irrespective of other access rights of the end user for other components of the document which differ from the access rights to the component.

* * * * *